United States Patent
King

(10) Patent No.: US 6,606,337 B1
(45) Date of Patent: Aug. 12, 2003

(54) MULTIPLE BAND RAMAN AMPLIFIER PUMP SOURCE

(75) Inventor: Nicholas King, Campbell, CA (US)

(73) Assignee: JDS Uniphase Corp., San Jose, CA (US)

( * ) Notice: Subject to any disclaimer, the term of this patent is extended or adjusted under 35 U.S.C. 154(b) by 74 days.

(21) Appl. No.: 09/843,173

(22) Filed: Apr. 26, 2001

(51) Int. Cl.[7] ................................................ H01S 3/091
(52) U.S. Cl. ............................ 372/70; 372/6; 372/102; 359/334
(58) Field of Search ........................ 359/334; 385/27; 372/6, 102, 70

(56) References Cited

U.S. PATENT DOCUMENTS

| | | | | |
|---|---|---|---|---|
| 5,039,199 A | * | 8/1991 | Mollenauer et al. | 359/334 |
| 5,841,797 A | * | 11/1998 | Ventrodu et al. | 372/6 |
| 6,041,072 A | * | 3/2000 | Ventrudo et al. | 372/102 |
| 6,141,086 A | * | 10/2000 | Vahala et al. | 356/28.5 |
| 6,212,310 B1 | * | 4/2001 | Waarts et al. | 385/24 |
| 6,298,187 B1 | * | 10/2001 | Waarts et al. | 385/37 |
| 6,377,389 B1 | * | 4/2002 | Grubb et al. | |
| 6,414,786 B1 | * | 7/2002 | Foursa | 359/334 |

* cited by examiner

Primary Examiner—Paul Ip
Assistant Examiner—Phillip Nguyen
(74) Attorney, Agent, or Firm—Kudirka & Jobse LLP

(57) ABSTRACT

An optical pumping apparatus provides pumping for a Raman amplifier across either the C-band alone, or across both the C-band and the L-band. A first pump unit provides the optical pump energy necessary for a flat gain response in the C-band. A second pump unit, operating as an upgrade module, can be activated to expand the pumping range into the L-band. The second unit provides both the pump energy for the expanded portion of the gain spectrum, as well as pump energy for the C-band that compensates for any disruption of the gain profile, so that a flat gain response is maintained across both the C-band and the L-band.

26 Claims, 3 Drawing Sheets

MULTIPLE BAND RAMAN AMPLIFIER PUMP SOURCE

FIELD OF THE INVENTION

This invention relates generally to optical gain devices and, more specifically, to pump apparatus for optical gain devices using stimulated Raman scattering.

BACKGROUND OF THE INVENTION

An optical gain medium is a device that, when provided with optical pumping energy, increases the amplitude of a desired optical signal. Optical gain media may be constructed using optical fiber, and used for fiber lasers or fiber-based optical amplifiers. One form of optical amplifier known in the art is based on stimulated Raman scattering (SRS), and is referred to generally as a "Raman amplifier." In a Raman amplifier, optical pumping energy is injected into an optical fiber medium through which the signal to be amplified is propagated. The optical pumping energy, via SRS, allows for a transfer of optical power to a wavelength longer than the pumping wavelength, due to the excitation of a vibrational mode in the medium that provides gain at the longer wavelength. A Raman laser is similar, but has no signal to be amplified, and through SRS, simply develops the pump signal into an output signal of higher power and longer wavelength using a resonator structure.

The longer wavelengths to which optical power is transferred in a Raman gain medium may be predetermined relative to the wavelength of the pumping energy. These wavelength shifts are referred to as "Stokes" shifts and, since each Stokes shift is a known amount relative to the wavelength from which the energy is transferred, a resulting "Raman-shifted" wavelength may be selected by proper selection of the pumping wavelength. In communication systems, a number of different signals at different wavelengths are typically multiplexed over the same communications medium, e.g., an optical fiber. These different signal wavelengths, or "channels," are in a continuous band, and are separated by a minimum channel spacing necessary for good discrimination. When it becomes necessary to boost the signal power of the signals, all of the channels are typically amplified together in an optical amplifier. However, the useful gain bandwidth of such an amplifier is necessarily limited, and the number of channels that can be amplified simultaneously is therefore also limited.

In current systems, wavelength bands have been identified that have customarily been used for optical communications. The conventional band is referred to as the "C-band" and is understood to span roughly a range from approximately 1530 nm to approximately 1565 nm. This has been the range to which optical amplifiers, typically erbium-doped fiber amplifiers ("EDFAs"), have been directed for operation. More recently, a band of longer wavelengths has come into favor for certain applications, and may be used either alone or in combination with the C-band. This band of longer wavelengths is referred to as the "L-band," and is understood to span roughly a range from approximately 1565 nm to approximately 1610 nm. In the past, Raman amplifiers have been made that provide amplification in the L-band. Similarly, attempts have been made to build Raman amplifiers that provide wideband amplification across both the C-band and the L-band, with varying degrees of success. However, such amplifiers tend to be complicated and costly as compared to those which amplify in the C-band alone. Moreover, amplifiers that pump in the C-band and the L-band simultaneously can not also be used to efficiently pump just one band or the other.

SUMMARY OF THE INVENTION

In accordance with the present invention, an optical pumping apparatus provides pumping for just a first wavelength band, or for the first wavelength band and a second wavelength band together. In particular, an optical pumping apparatus provides optical pump energy to an optical gain medium that produces optical gain by stimulated Raman scattering. The gain is provided to each of a first signal wavelength range and a second signal wavelength range, the second range having longer signal wavelengths and not overlapping with the first. The pumping apparatus includes two pump units, a first pump unit that provides optical pump energy to the gain medium in a first pump wavelength range, and a second pump unit that provides pump energy to the gain medium in both the first pump wavelength range and a second pump wavelength range. Pumping in the first pump wavelength range results in signal gain in the first signal wavelength range, while pumping in the second pump wavelength range results in signal gain in the second signal wavelength range.

In addition to producing gain in the second signal wavelength range, pumping in the second pump wavelength range also tends to deplete the gain spectrum in the first signal wavelength range. This would ordinary cause a disruption in the gain bandwidth of the first signal wavelength range in that the overall flatness of the gain response would be compromised. However, the second pump unit of the present invention also provides pump energy that produces gain in the first signal bandwidth, and that compensates for any disturbances due to pumping for the longer wavelengths. Thus, the second pump unit can operate as an upgrade unit, in that it allows a user to extend the signal gain bandwidth beyond that of the first signal wavelength range, and still maintain the overall flatness of the gain response. That is, when the second pump unit is not activated, the pumping apparatus provides a gain response with good flatness over the first signal wavelength range. When the second pump unit is activated, the gain response is extended to the second signal wavelength range, and good flatness is maintained over both wavelength ranges.

The second pump unit may be in the form of a detachable module, to allow it to be connected and disconnected from the first pump unit. The pumping by the second pump unit so as to provide gain in both signal wavelength ranges is preferably such that with or without the use of the second pump unit, the flatness maintained across the gain spectrum is good enough that the signal gain does not deviate more than 1 dB from a pre-selected spectral shape within the designated wavelength band. That is, the flatness refers not just to maintaining an approximately constant signal gain across the designated wavelength band, but to preventing deviation from any chosen gain spectrum shape. The second pump unit also includes a first pump source and a second pump source. With regard to the degree to which the second pump source of the second pump unit pumps for the first signal wavelength, it is preferred that the second pump source does not provide direct signal gain in the second signal wavelength range any greater than one-half of the maximum signal gain that it produces.

In the preferred embodiment, the pump energy from the first pump unit and that from the second pump unit is combined by a pump combiner before being directed to the gain medium. This pump combiner may be, for example, a wavelength division multiplexer. Although the wavelength ranges in question may vary depending upon the application, the preferred embodiment of the invention is directed to providing gain in the conventional "C-band" and "L-band." For example, the first signal wavelength band may be from approximately 1530 nm to approximately 1565 nm, and the second signal wavelength band may be from approximately 1565 nm to approximately 1610 nm. Furthermore, although the wavelength outputs from the different pump sources should fit the conditions described above, it is recognized that a plurality of pump sources may be used together to provide any of the necessary wavelength outputs, such as the optical energy output from the first pump unit.

BRIEF DESCRIPTION OF THE DRAWINGS

The above and further advantages of the invention may be better understood by referring to the following description in conjunction with the accompanying drawings in which.

DETAILED DESCRIPTION

Figure 1:
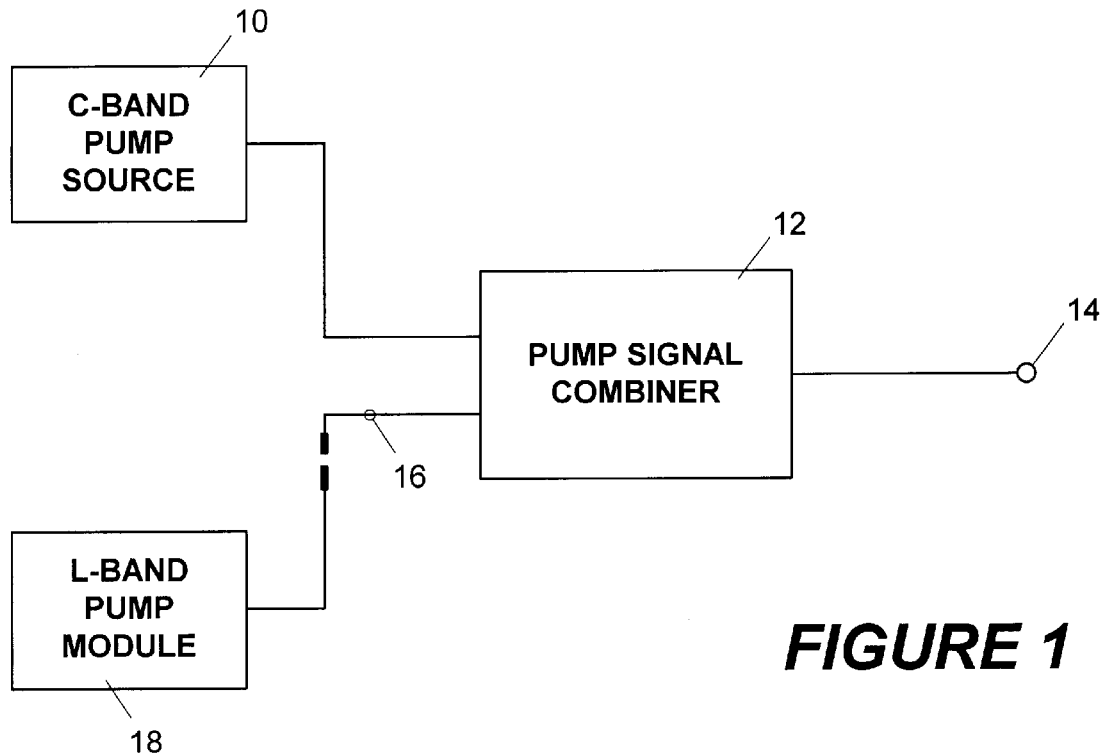
FIG. 1 is a schematic view of an optical pumping apparatus according to the present invention.

Shown in FIG. 1 is a schematic depiction of the general structure of a system according to the invention. The output of a C-band pump source 10 is coupled into a pump signal combiner 12, from which it is directed to an output port 14 that is connected to a Raman gain medium to be pumped. The C-band pump source 10 may be a combination of different optical sources coupled together to provide a desired range of pump wavelengths at different respective powers. Such a combination of wavelengths can provide a desired gain profile across the C-band. In particular, it is usually desirable to provide a pump source that results in a reasonably flat gain profile in the C-band so that all of the multiplexed channels of the system are provided with approximately the same degree of optical gain.

The pump signal combiner 12 shown in FIG. 1 also has a second input 16 that receives an output from L-band pump module 18. The C-band pump source and the signal combiner 12 are such that, when the L-band pump module 18 is not connected, pumping is provided to the Raman gain medium at the output port 14 of the system that results in a flat gain profile in the C-band. With the L-band pump module 18 connected, however, the optical pump energy from the C-band pump source and the optical pump energy of the L-band pump module are coupled together. This combined pump energy expands the pumping range of the system, and pumps the Raman gain medium in such a way that gain is provided in both the C-band and the L-band. Moreover, the pump energy is such that a high degree of flatness is provided in the gain profile of the Raman amplifier across both the C-band and the L-band.

The system shown in FIG. 1 operates as an upgradeable Raman pump source, allowing it to be used for C-band pumping alone, or to upgrade it to operate in both the C-band and the L-band. Such an upgradeable system might suffer from severe problems in the flatness of the gain profile following the addition of the pumping directed to pumping of the L-band. However, in the present invention, a combination of pump sources is used that provide gain in the desired L-band gain without significantly impairing the flatness of the overall gain profile.

Figure 2:
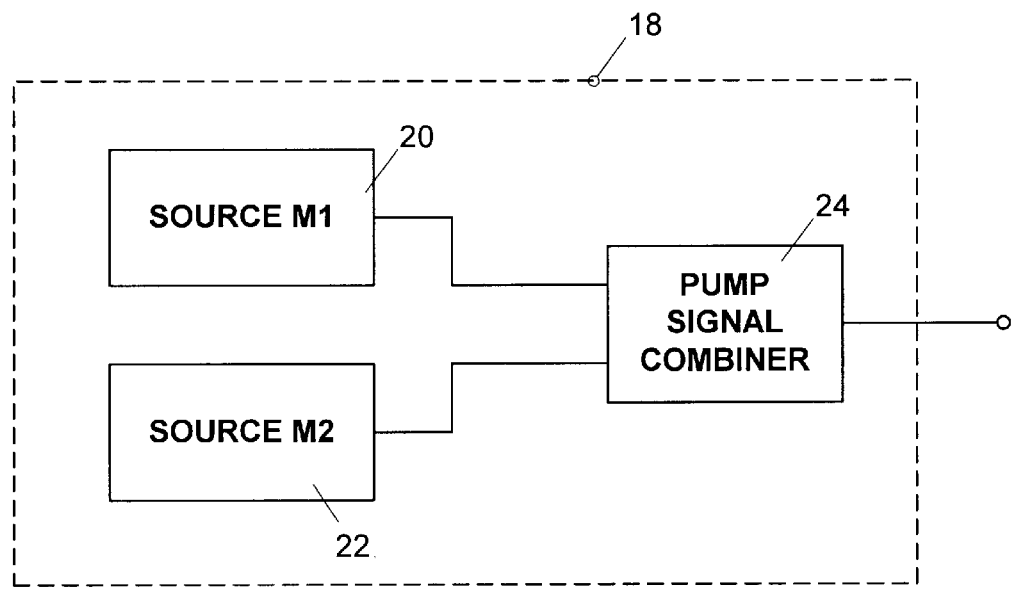
FIG. 2 is a schematic view of an upgrade module of the pumping apparatus shown in FIG. 1.

Shown in FIG. 2 is a schematic view of the pump sources of an L-band pump module according to the present invention. This module provides pump energy that is added to the pump energy of an existing C-band pump source. As shown, the module 18 consists of two pump sources coupled together. Those skilled in the art will understand that, while this embodiment shows only two sources, the total number of pump sources coupled together by the module 18 may actually be higher. The two sources are labeled in the figure "Source M1" (identified by reference numeral 20) and "Source M2" (identified by reference numeral 22). The outputs from each of these optical sources are directed to pump signal combiner 24, which combines the signals in a known manner. For example, the pump signal combiner 24 may be a wavelength division multiplexer ("WDM") coupler, although other means of coupling together two optical signals having different wavelengths are also known in the art, and may also be used. The coupled optical pump signals are output from the module with the intention of being combined with other pump energy directed to a Raman gain medium.

The two pump sources 20, 22 of the L-band module 18 have distinctly different output wavelengths. In the preferred embodiment, the sources 20, 22 are laser diodes, but other types of optical sources may be used as well. In order to provide adequate Raman gain in the L-band of the amplifier being pumped, source M2 22 has an output wavelength in the range of approximately 1465 nm to approximately 1525 nm. For example, the source M2 22 may have an output wavelength of 1496 nm. Such a wavelength, through SRS, provides gain in the Raman amplifier in the L-band. However, since there already exists some pumping in the C-band of the amplifier, if this L-band pumping wavelength was the only pumping energy added to the existing C-band pump energy, other unintended consequences would result. Most notably, the overall gain flatness of the amplifier would be severely degraded, resulting in an undesirable variation in gain from one channel to the next. However, in the present invention, an additional pumping source is provided that allows the L-band pumping to take place, but preserves a high degree of gain flatness across both the C-band and the L-band.

In the module shown in FIG. 2, in addition to the source M2 22, which pumps in the L-band, source M1 20 is also provided. However, despite being part of the L-band module 18, this source has an output wavelength that, in a Raman amplifier, provides gain in the C-band. That is, the source M1 has an output in the wavelength range of approximately 1425 nm to approximately 1465 nm. For example, source M1 might have an output wavelength of approximately 1436 nm. Although this wavelength produces Raman gain primarily in the C-Band, it compensates for disruptions in the overall gain flatness of the amplifier that would otherwise result from pumping to produce gain in the L-band.

Figure 3:
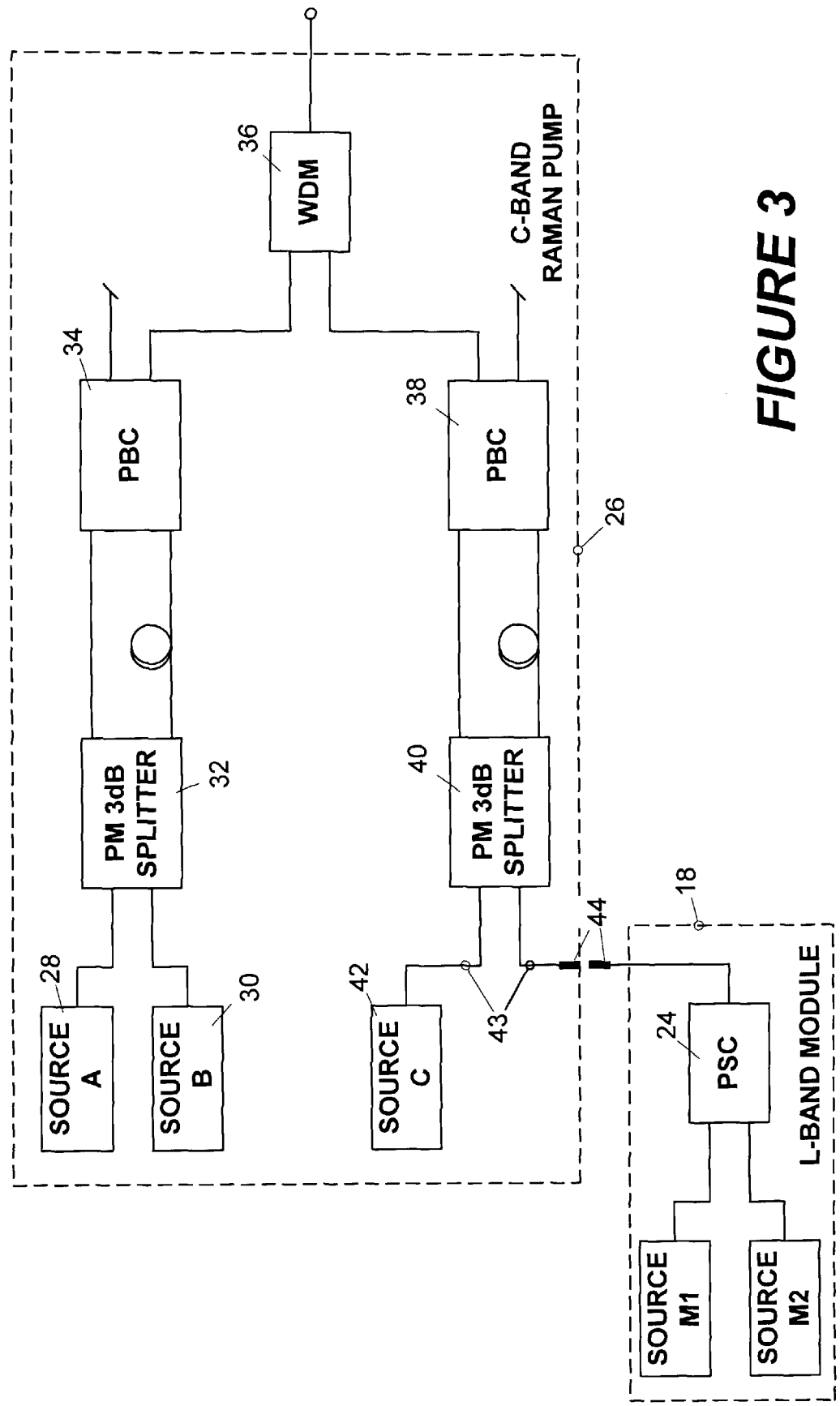
FIG. 3 is a schematic view of a preferred embodiment of the pumping apparatus of the present invention, in which a C-band Raman pump may be used in conjunction with an L-band upgrade module.

Depicted in FIG. 3 is an example of a pumping apparatus using an L-band module like that FIG. 2. As shown, the apparatus being depicted includes C-band Raman pump 26. This is a stand-alone C-band pump that provides a flat gain bandwidth across the C-band of a Raman amplifier. The arrangement of components in the C-band pump 26 represents just one embodiment, and pumps having a similar result are possible without necessarily having the same arrangement of components. However, this embodiment is a useful example of a possible construction.

The C-band pump includes three different individual optical sources having different output wavelengths, the sources being labeled in the figure as "Source A," "Source B" and "Source C." The pump also includes signal-combining apparatus for combining all of the different source wavelengths together. In this embodiment, the combining apparatus each have a depolarizing function that helps to minimize any polarization dependent gain effects. Source A 28 and Source B 30 are coupled into the two input ports of a polarization-maintaining ("PM") 3 dB splitter 32. Both input paths to the splitter 32 are polarization-maintaining conduits, such as polarization-maintaining fiber. Each of the inputs is split between two output paths of the splitter 32, such that a portion of each input is coupled into each of the two outputs. The outputs are also polarization-maintaining, and connect the splitter 32 to a polarization beam combiner ("PBC") 34. The PBC 34 is a known optical device that combines together the two polarization states of the optical energy input via the fibers connecting it to the splitter 32. The PBC couples the two polarization modes from the fibers into a single output.

The second output receives only a small amount of the light coupled into the PBC, and is referred to as a "ghost port." The PBC 34 effectively recombines, power wise, the two light beams that exit the splitter 32. Thus, the optical power of light exiting the PBC is substantially the same as the total power originating from the sources 28, 30 (ignoring splice losses and insertion losses). However, the power has been split into two halves with phase decorrelated orthogonal polarizations. Thus, the resulting output from PBC 34 is essentially unpolarized.

Between the splitter 32 and the PBC 34 shown in FIG. 3, one of the two paths between the splitter 32 and the PBC 34 has a significantly longer optical path length than the other. This provides the desired phase decorrelation between the two signals. In the preferred embodiment, the difference in optical path length is greater than a coherence length of either of the sources 28, 30. Moreover, for one of the two paths coupling splitter 32 and PBC 34, the polarization is rotated by 90°. As mentioned, the two signals input to the PBC 34 are coupled together, and exit as a depolarized output consisting of a portion of light from each of the two sources 28, 30. This output, in turn, is directed to WDM combiner 36.

The WDM combiner 36 combines the output from PBC 34 with light output from PBC 38. PBC 38 is part of another depolarizing combiner that functions in essentially the same way as that having splitter 32 and PBC 34. In the second combiner, a polarization-maintaining splitter 40 is coupled to PBC 38 by two polarization-maintaining fibers. As in the other combining apparatus, one of the two coupling fibers has a longer optical path length than the first, and one has its plane of polarization rotated by 90° relative to the other. When the pump is operating as a pump for the C-band alone, the only light input to splitter 40 comes from an optical source 42 labeled in the fiber as "Source C." In such a case, the output from Source C 42 is effectively depolarized and output from PBC 38, after which it is combined with the output of PBC 34 at WDM 36.

When the C-band Raman pump 26 is operated alone, the output from WDM 36 provides a range of pumping energy that provides a sufficiently flat Raman gain response in the C-band. However, when it is desirable to pump for both the C-band and the L-band, the L-band module is coupled into the existing pump. In the embodiment shown in FIG. 3, the output from the L-band module 18 is coupled into the splitter 40 along with the output of Source C 42. Both input fibers to splitter 40 are polarization maintaining. Coupler elements 44 are shown to indicate that the L-band module 18 may be removably connected to the C-band pump. The actual coupling apparatus may be any of a number of known types of couplers. Moreover, it is not necessary that the L-band module actually be physically disconnected from the C-band pump. Rather, the module 18 may be a permanent part of the apparatus that has an output that may be "activated" and "deactivated," in that its output is, or is not, combined with the pump energy of the C-band pump 26. When using the pump energy combining method shown in FIG. 3, the optical fiber pathways input and output to the pump signal combiner 24 are polarization maintaining, as are the connectors 44. However, it should be noted that this is a preferred embodiment only, and the invention is also intended to encompass other ways of combining pump signal energy which may not require polarization maintaining pathways.

When the module 18 is connected to the C-band pump 26 and active, its output is coupled together with the output of Source C 42 in the same manner as is described above for the combination of Source A 28 and Source B 30. This combined output is then coupled together by WDM with the output from PBC 34. Unlike when the output from module 18 is not used, the output from WDM 36 when the module is active includes wavelengths that pump both the C-band and the L-band. Moreover, the combination of L-band and C-band pumping wavelengths from the L-band module not only provides the desired pumping in the L-band, but provides compensation for the distortion that would otherwise occur in the flatness of the overall gain profile.

Figure 4:
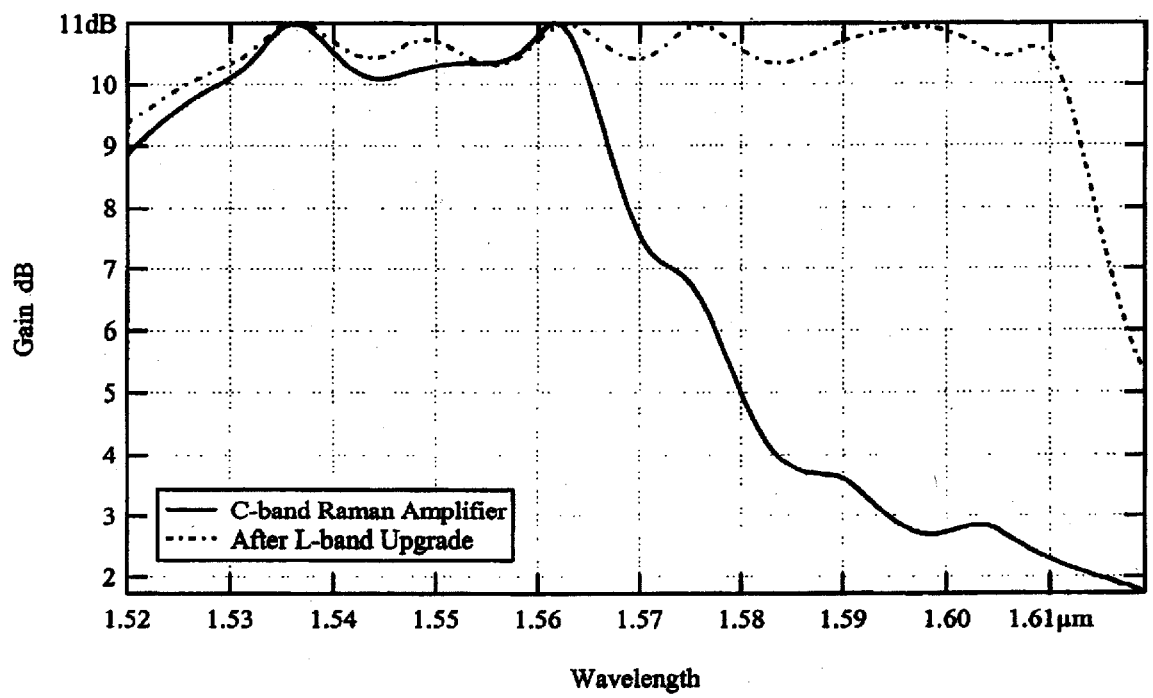
FIG. 4 is a graphical view of a signal gain bandwidth of a Raman gain medium when the preferred embodiment of the invention is used with and without the L-band upgrade module.

Using the values mentioned above for the output wavelengths of the sources M1 and M2 of the L-band profile (respectively, 1439 nm and 1492 nm), the following wavelength values might be used for the C-band Raman pump. Source A could be at a wavelength of 1451 nm, Source B at a wavelength of 1462 nm and Source C at a wavelength of 1428 nm. At these wavelength values, a good flatness will be present when the C-band pump 26 is used alone. Moreover, when the L-band module is connected and activated, a good flatness exists across both the C-band and the L-band. FIG. 4 depicts graphically a gain response for a Raman amplifier that is pumped using a pump having these example values. The solid line response shown in the figure demonstrates the response when the L-band module is not used. As shown, the response drops off quickly after approximately 1565 nm. However, within the C-band range, the gain response of the amplifier is particularly flat. In this case, the amplifier gain response varies by less than 1 dB across the C-band.

Upon the addition of the L-band module described above, the gain response of the Raman amplifier is extended. In the graph of FIG. 4, the response of the amplifier, when using the L-band module, is shown as a broken line. As shown, the gain response is extended through the L-band, dropping off only after about 1610 nm. Moreover, the gain flatness of the response is preserved, and the amplifier has a gain response that does not vary more than about 1 dB across both the C-band and the L-band. Thus, the system has good performance both when used as just a C-band amplifier, and when expanded to be used in both the C-band and the L-band. It should be noted that this definition of "flatness" herein is intended to apply to gain spectra having any pre-selected spectral shape, which may be intentionally created for a particular application. That is, the deviation of about 1 dB or less is a deviation from the pre-selected shape of the designated gain spectrum, rather than from a particular fixed gain value. Of course, the slope may be zero, as shown above. It is also noted that the flatness is controlled only for the designated band or bands in question. For the examples discussed above, the bands are the C-band and the L-band, as defined therein. As shown in FIG. 4, the gain naturally falls off outside of these designated wavelength bands, as should be expected.

In the preferred embodiment, pumping energy provided to the C-band by the L-band module does not spread significantly into the L-band, despite the tendency of certain pump sources to have a bandwidth profile that extends over a given range. In particular, source M1 does not contribute any gain to the L-band that exceeds 50% of the maximum gain in the C-band. Thus, the function of this additional source is to provide compensatory gain to the C-band, while source M2 provides the desired L-band gain.

The foregoing example is particularly relevant due to the common use of the C-band and L-band in current-day optical communications. However, it is expected that there will be future attempts to further extend the bandwidth capacity of optical communications systems so as to accommodate even more multiplexed channels. It is therefore recognized that the present invention may be adapted to aid those expansion efforts as well. For example, in the foregoing example, the gain bandwidth of the Raman amplifier could be expanded further by the addition of yet another upgrade module or modules. With the system operating as a pump for a Raman amplifier spanning the C-band and L-band, another combination of optical sources could be coupled into the existing system to extend the gain bandwidth further into the longer wavelengths. As with the aforementioned upgrade module, this additional upgrade module would include a source that provides pump energy to generate gain in the extended portion of the gain bandwidth, and a source that provides pump energy to generate gain in the existing portion of the gain bandwidth to compensate for the disruption in the flatness of the gain profile that would otherwise occur. That is, one source would have a higher center wavelength than the sources of the existing range of pump sources, therefore providing Raman gain in a higher wavelength range. Meanwhile, another source of the additional upgrade module would have a center wavelength within the wavelength range of the existing sources. Obviously, further extensions of the gain bandwidth could be accomplished in a similar manner.

While the invention has been shown and described with regard to a preferred embodiment thereof, those skilled in the art will recognize that various changes in form and detail may be made herein without departing from the spirit and scope of the invention as defined by the appended claims.

What is claimed is:

1. An optical pumping apparatus for providing optical pump energy to an optical gain medium that provides optical gain by stimulated Raman scattering to each of a first wavelength range and a second wavelength range, the second wavelength range having longer wavelengths than the first wavelength range and not overlapping with the first wavelength range, the apparatus comprising:

a first pump unit that provides optical pump energy to the gain medium that produces signal gain in the first wavelength range; and a second pump unit that has a first pump source that provides optical pump energy to the gain medium that produces signal gain in the second wavelength range, and a second pump source that provides optical pump energy to the gain medium that produces signal gain in the first wavelength range, the second pump unit being switchable such that the apparatus may be operated with just the first pump unit activated, or with both the first and second pump units activated.

2. An apparatus according to claim 1 wherein the second pump unit is part of a pumping module that, when attached and activated, extends the signal gain bandwidth of the apparatus to include the second wavelength range.

3. An apparatus according to claim 1 wherein the second pump source of the second pump unit does not provide direct signal gain in the second wavelength range any greater than one half of the maximum gain in the first wavelength range.

4. An apparatus according to claim 1 wherein, when the second pump unit is not activated, the signal gain does not deviate more than 1 dB from a pre-selected spectral shape of the gain spectrum of the first wavelength range.

5. An apparatus according to claim 1 wherein, when the second pump unit is activated, the signal gain does not deviate more than 1 dB from a pre-selected spectral shape of the gain spectrum across the first wavelength range and the second wavelength range.

6. An apparatus according to claim 1 wherein pumping by the first pump source of the second pump unit depletes gain in the first wavelength range, and wherein pumping by the second pump source of the second pump unit compensates for said depleted gain.

7. An apparatus according to claim 1 further comprising a pump signal combiner that combines the pump energy from the first pump unit and the second pump unit and directs it to the optical gain medium.

8. An apparatus according to claim 7 wherein the pump signal combiner comprises a wavelength division multiplexer.

9. An apparatus according to claim 1 wherein the first wavelength range is from approximately 1530 nm to approximately 1565 nm.

10. An apparatus according to claim 9 wherein the second wavelength range is from approximately 1565 to approximately 1610 nm.

11. An apparatus according to claim 1 wherein the first pump unit comprises a plurality of individual pump sources.

12. An optical pumping apparatus for providing optical pump energy to an optical gain medium that provides optical gain by stimulated Raman scattering to each of a first wavelength range and a second wavelength range, the second wavelength range having longer wavelengths than the first wavelength range and not overlapping with the first wavelength range, the apparatus comprising:

a first pump unit that provides optical pump energy to the gain medium that produces signal gain in the first wavelength range;

a second pump unit that has a first pump source that provides optical pump energy to the gain medium that produces signal gain in the second wavelength range, and a second pump source that provides optical pump energy to the gain medium and that produces signal gain in the first wavelength range while not producing signal gain in the second wavelength range any greater than half of the maximum signal gain in the first wavelength range, the apparatus being operable with just the first pump source activated or with both the first and second pump units activated, when the second pump source is not activated, the signal gain not deviating by more than 1 dB from a pre-selected spectral shape of the gain spectrum of the first wavelength range, and when the second pump source is activated, the signal gain not deviating more than 1 dB from a preselected spectral shape of the gain spectrum across the first wavelength range and the second wavelength range; and a pump signal combiner that combines the pump energy from the first pump unit and the second pump unit and directs it to the optical gain medium.

13. An apparatus according to claim 12 wherein the second pump unit is part of a pumping module that, when activated, extends the signal gain bandwidth of the apparatus to include the second wavelength range.

14. An apparatus according to claim 12 wherein pumping by the first pump source of the second pump unit depletes gain in the first wavelength range, and wherein pumping by the second pump source of the second pump unit compensates for said depleted gain.

15. An apparatus according to claim 12 wherein the first wavelength range is from approximately 1530 nm to approximately 1565 nm and the second wavelength range is from approximately 1565 to approximately 1610 nm.

16. A method of providing optical pump energy to an optical gain medium that provides optical gain by stimulated Raman scattering to each of a first wavelength range and a second wavelength range, the second wavelength range having longer wavelengths than the first wavelength range and not overlapping with the first wavelength range, the method comprising:

coupling optical pump energy into the gain medium with a first pump unit so as to produce signal gain in the first wavelength range; and activating a second optical pump unit coupled with the first pump unit, the second pump unit comprising a first pump source, the optical output from which produces signal gain in the second wavelength range, and a second pump source, the optical output from which produces signal gain in the first wavelength range, the apparatus being operable with just the first pump source activated, or with both the first and second pump units activated.

17. A method according to claim 16 wherein the second pump unit is part of a pumping module that, when activated, extends the signal gain bandwidth of the apparatus to include the second wavelength range.

18. A method according to claim 16 wherein the second pump source of the second pump unit does not provide direct signal gain in the second wavelength range any greater than one half of the maximum signal gain in the first wavelength range.

19. A method according to claim 16 wherein, when the second pump unit is not activated, the signal gain does not deviate more than 1 dB from a pre-selected spectral shape of the gain spectrum of the first wavelength range.

20. A method according to claim 16 wherein, when the second pump unit is activated, the signal gain does not deviate more than 1 dB from a pre-selected spectral shape of the gain spectrum across the first wavelength range and the second wavelength range.

21. A method according to claim 16 wherein pumping by the first pump source of the second pump unit depletes gain in the first wavelength range, and wherein pumping by the second pump source of the second pump unit compensates for said depleted gain.

22. A method according to claim 16 further comprising combining the pump energy from the first pump unit and the second pump unit with a pump signal combiner and directing it to the optical gain medium.

23. A method according to claim 22 wherein the pump signal combiner comprises a wavelength division multiplexer.

24. A method according to claim 16 wherein the first wavelength range is from approximately 1530 nm to approximately 1565 nm.

25. A method according to claim 24 wherein the second wavelength range is from approximately 1565 to approximately 1610 nm.

26. A method according to claim 16 wherein the first pump unit comprises a plurality of individual pump sources.

* * * * *

UNITED STATES PATENT AND TRADEMARK OFFICE
CERTIFICATE OF CORRECTION

PATENT NO. : 6,606,337 B1
DATED : August 12, 2003
INVENTOR(S) : King

It is certified that error appears in the above-identified patent and that said Letters Patent is hereby corrected as shown below:

Column 4,
Line 57, "M1 might have" should read -- M1 20 might have --

Column 9,
Line 31, "to produce signal gain in" should read -- to produce signal gain exclusively in --

Signed and Sealed this

Thirteenth Day of July, 2004

JON W. DUDAS
*Acting Director of the United States Patent and Trademark Office*